(12) United States Patent
Aikoh et al.

(10) Patent No.: US 7,200,849 B2
(45) Date of Patent: Apr. 3, 2007

(54) OPTICAL HEAD AND OPTICAL DISC DRIVE

(75) Inventors: Hideki Aikoh, Higashiosaka (JP);
Tohru Nakamura, Katano (JP); Osamu Mizuno, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 400 days.

(21) Appl. No.: 10/761,617

(22) Filed: Jan. 21, 2004

(65) Prior Publication Data
US 2004/0154034 A1    Aug. 5, 2004

(30) Foreign Application Priority Data
Jan. 22, 2003  (JP)  ............... 2003-013053

(51) Int. Cl.
*G11B 7/08* (2006.01)
(52) U.S. Cl. ..................................... 720/681
(58) Field of Classification Search ............. 720/681, 720/683
See application file for complete search history.

(56) References Cited

U.S. PATENT DOCUMENTS 5,301,175 A    4/1994    Nakamura 6,452,895 B1 *  9/2002   Kawano ............... 720/681

* cited by examiner

*Primary Examiner*—Allen Cao
(74) *Attorney, Agent, or Firm*—Akin Gump Strauss Hauer & Feld, LLP

(57) ABSTRACT

An optical head is driven in a tracking direction with respect to a rotating optical disc. The optical head includes a light source, an optical block, a condenser shifter, and a rotating mechanism. The light source is used to read and write data from/on the optical disc. The optical block supports the light source. The condenser shifter includes a condenser, a movable body, a base, a focus direction drive mechanism and a tracking direction drive mechanism. The condenser focuses light, emitted from the light source, toward the optical disc. The movable body supports the condenser. The base supports the movable body elastically such that the movable body is able to shift in a focus direction and in the tracking direction. The focus and tracking direction drive mechanisms are provided to shift the movable body in the focus and tracking directions, respectively. The rotating mechanism rotates the condenser shifter around a predetermined axis with respect to the optical block on at least one of a first plane, which is parallel to the tracking direction and perpendicular to the optical disc, and a second plane, which is perpendicular to the tracking direction.

11 Claims, 9 Drawing Sheets

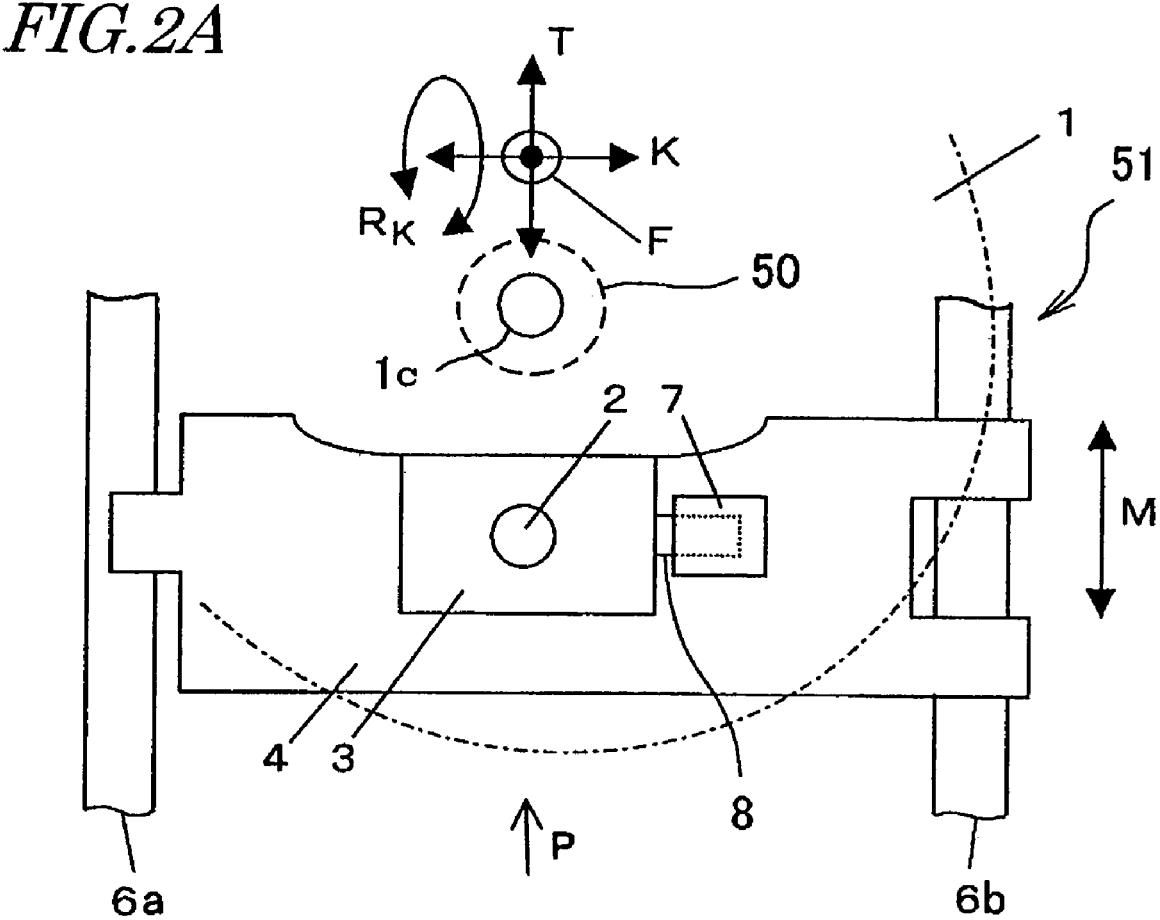
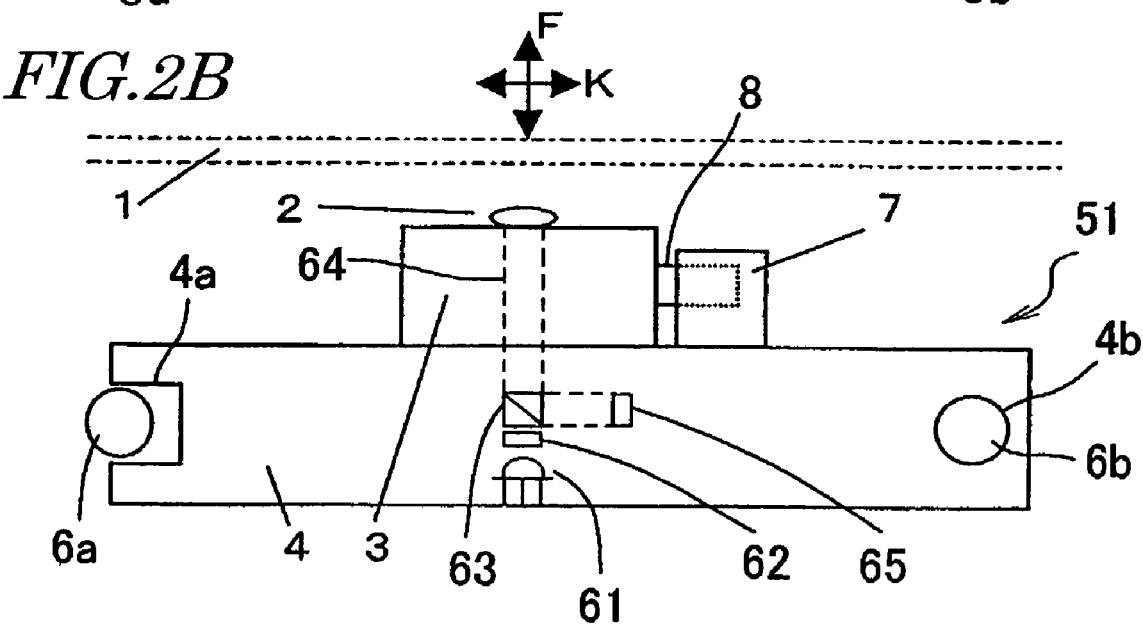

*FIG.4A* *FIG.4B*
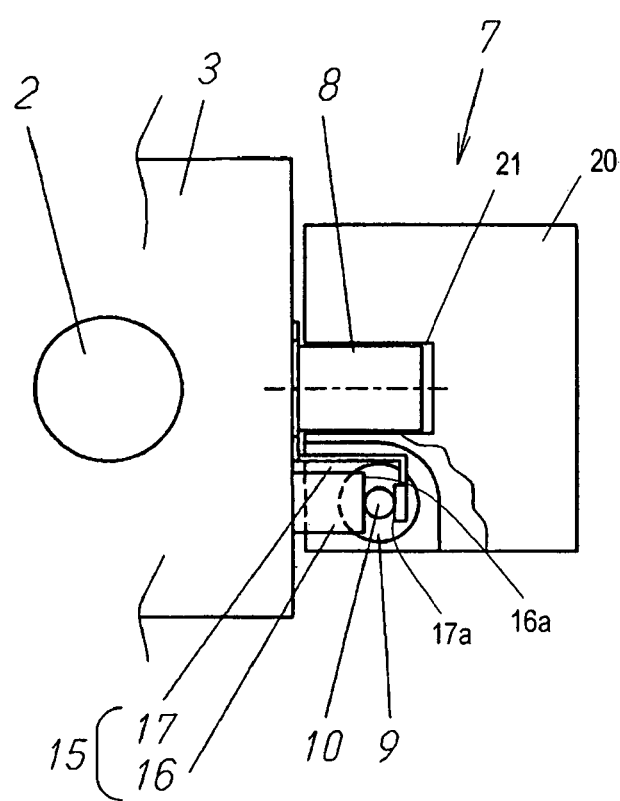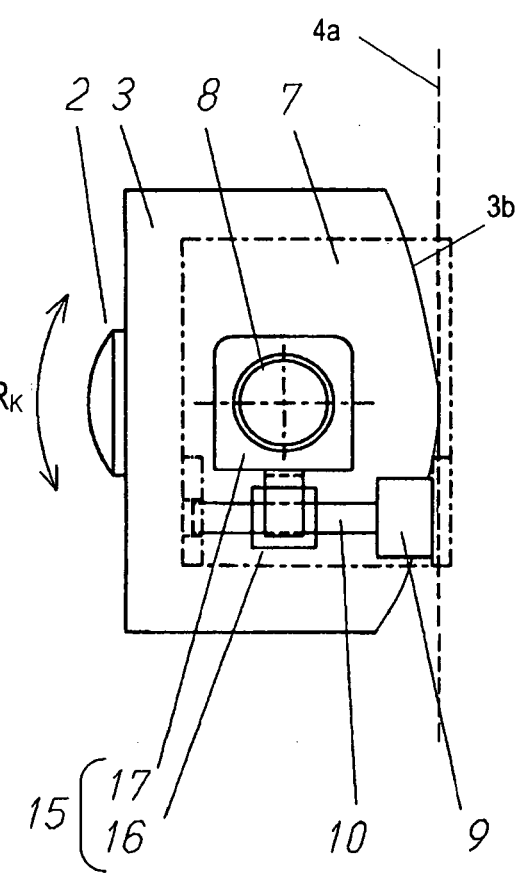
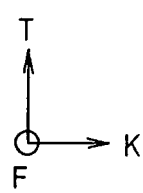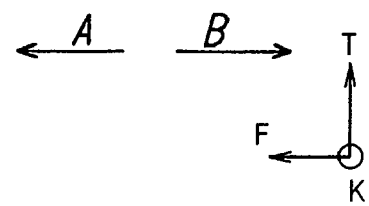

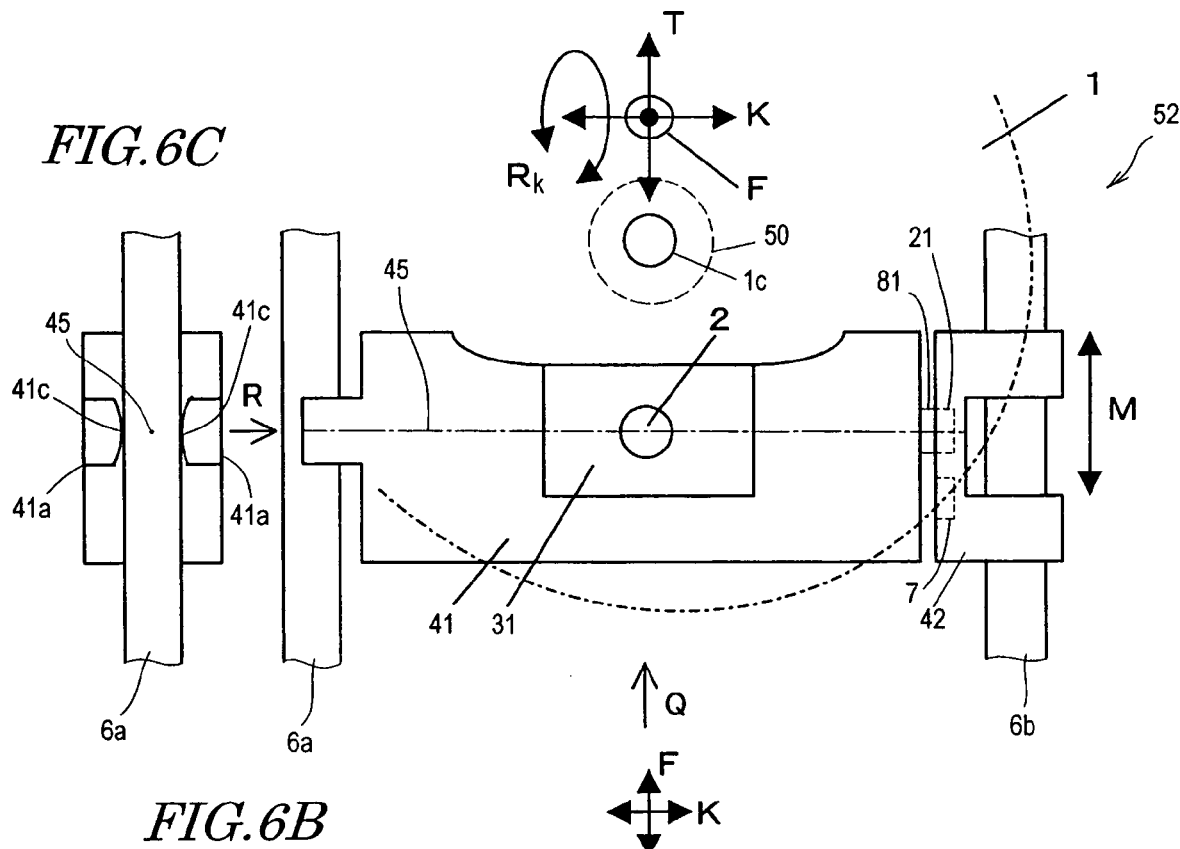
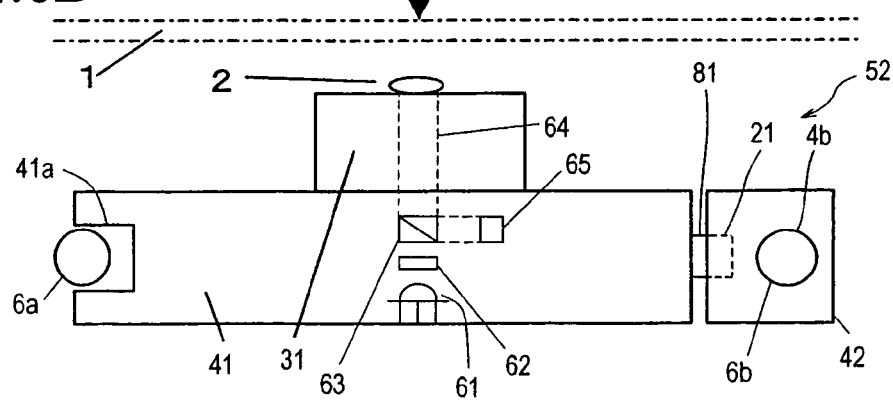

FIG.7A
FIG.7B
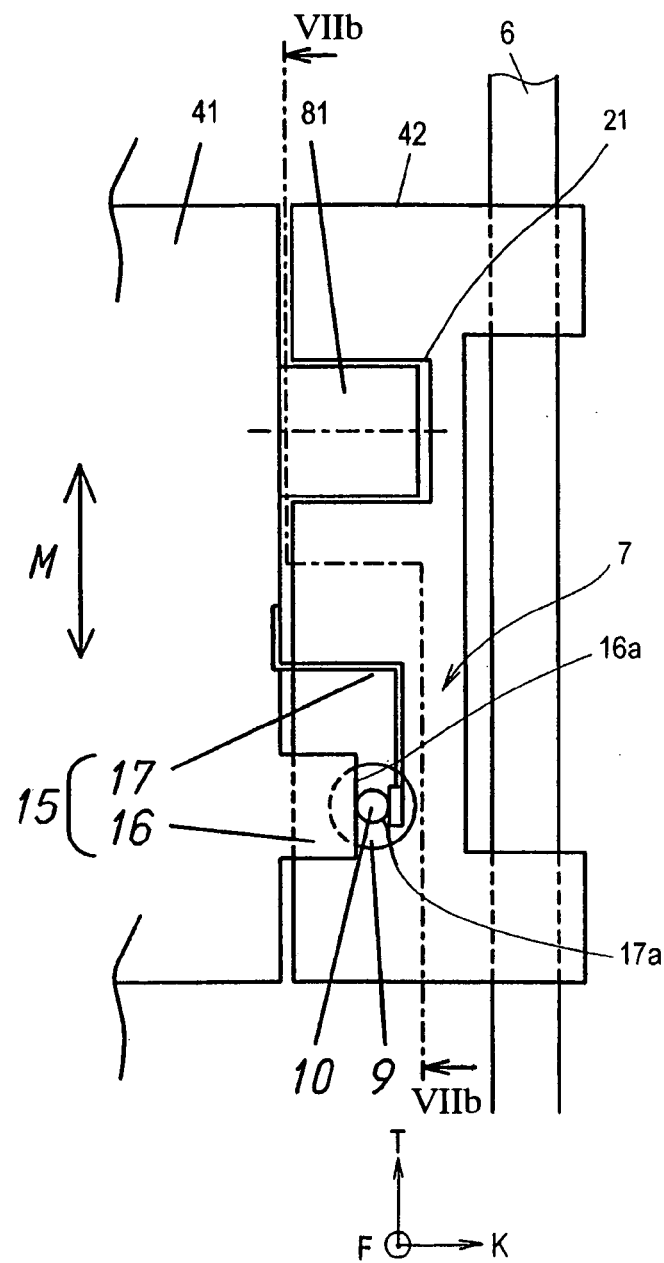
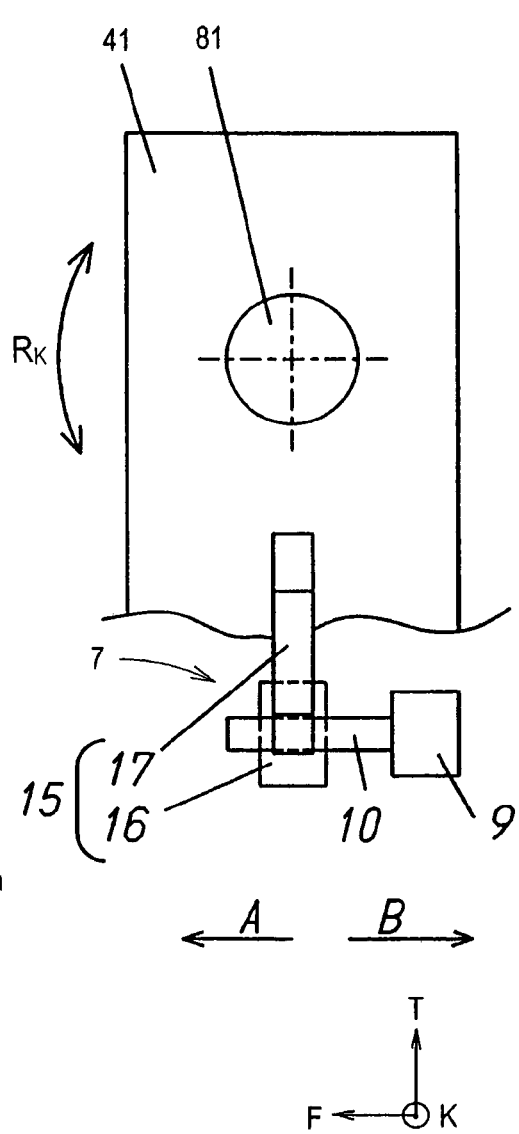

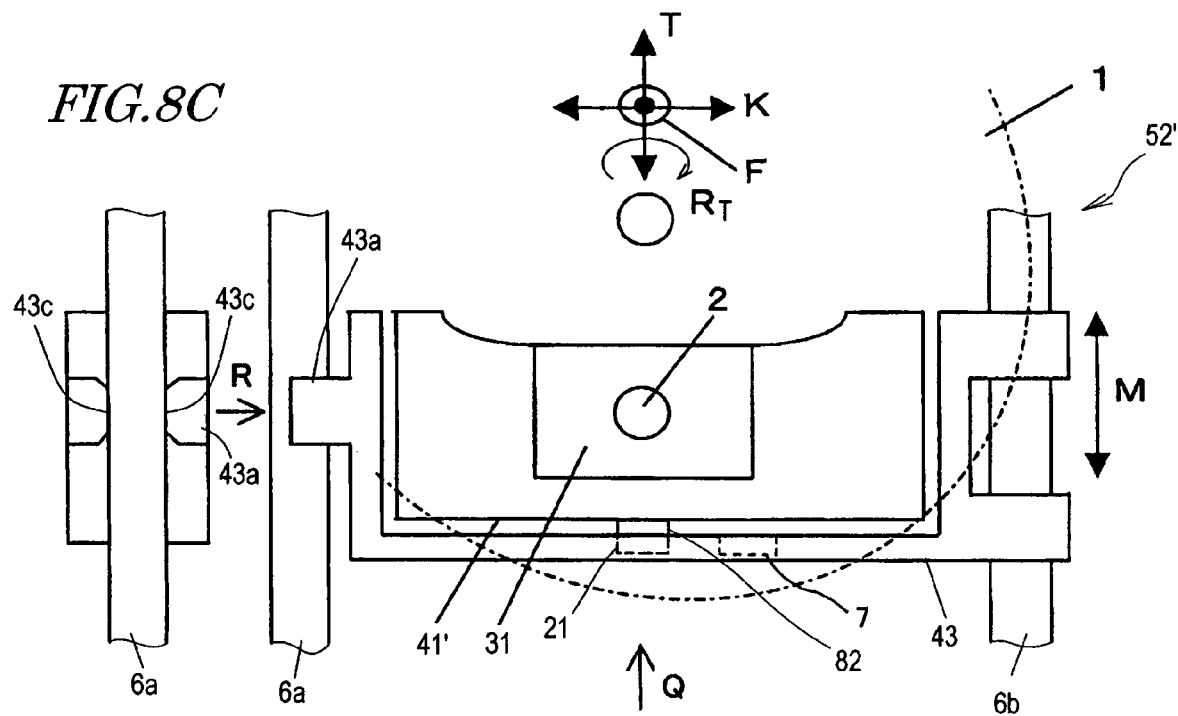
FIG.8A
FIG.8C
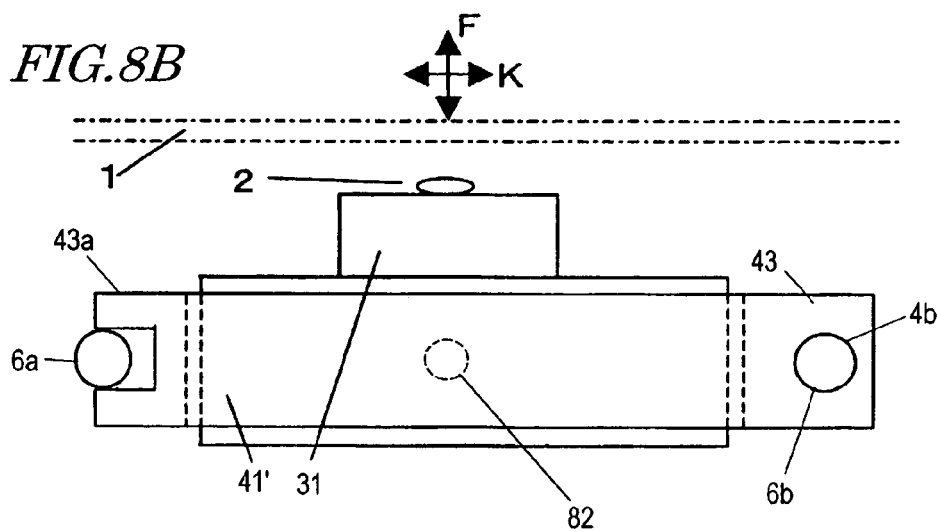
FIG.8B

FIG.9A
FIG.9B
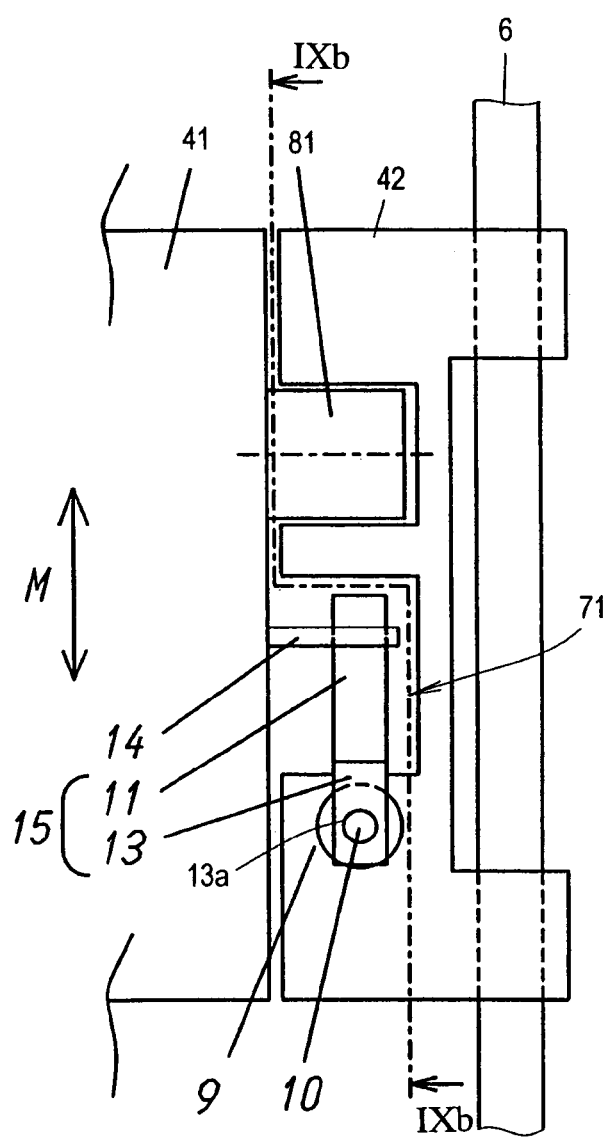
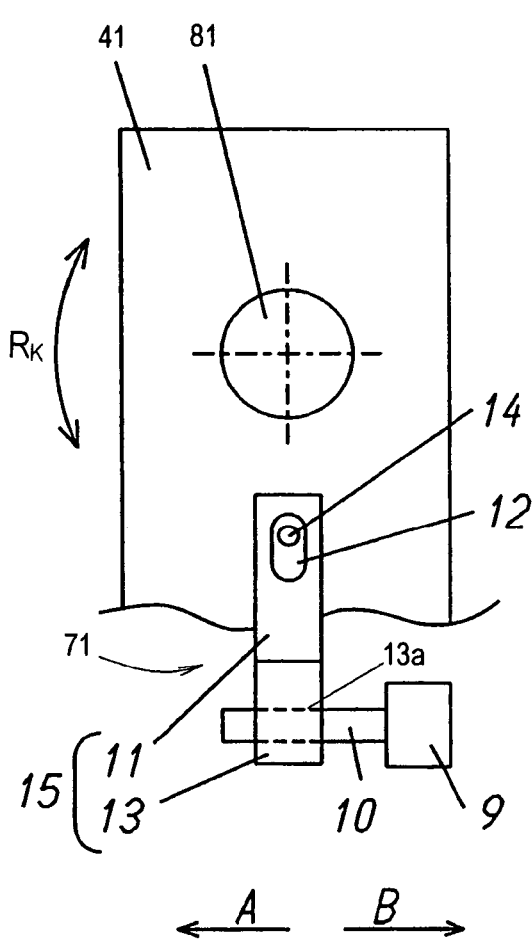

OPTICAL HEAD AND OPTICAL DISC DRIVE

BACKGROUND OF THE INVENTION

1. Field of the Invention

The present invention relates to an optical disc drive for optically reading and/or writing data from/on various types of data storage media such as an optical disc (which will be referred to herein as an "optical disc" collectively), and more particularly relates to an optical disc drive that can make a tilt correction on a light beam.

2. Description of the Related Art

In an optical disc drive for reading and/or writing data from/on an optical disc by means of a light beam, if the data storage layer of the optical disc has tilted with respect to an objective lens, then the optical axis of the light beam will define some tilt angle with respect to a normal to the data storage layer. That is to say, in that situation, the incoming light beam is no longer perpendicular to the data storage layer of the optical disc. Once such a relative tilt (which will be simply referred to herein as a "tilt") has been formed, the light beam impinging on the data storage layer comes to have some optical aberration. Such a tilt-induced aberration increases proportionally to the third power of the numerical aperture of the objective lens. For that reason, in order to read and/or write data from/on an optical disc just as intended by using a latest optical disc drive in which the objective lens has an increased numerical aperture to write data on the optical disc more densely, it becomes more and more important to correct the tilt of the optical axis of the light beam for use in the read and write operations.

An optical disc drive normally includes an optical head, which can move in the radial direction of a given optical disc (i.e., in the tracking direction) and which includes a correcting mechanism with the optical axis tilt correcting capabilities described above. More specifically, the optical head usually includes a movable body, which supports an objective lens thereon and which is provided with multiple coils. In this optical head, when a drive current is supplied to the coils, the movable body can be rotated such that the objective lens defines any desired angle with respect to the optical disc and that the tilt of the optical axis of the light beam with respect to the optical disc can be corrected. This movable body works as an objective lens driver and can not only correct the tilt but also drive the objective lens in the focus direction or in the tracking direction.

For example, Japanese Laid-Open Publication No. 4-366429 discloses an objective lens driver such as that shown in FIG. 1A. In FIG. 1A, the arrow F (i.e., the direction coming out of the paper) indicates the focus direction, the arrow T indicates the tracking direction, the arrow K indicates a tangential direction and the arrow R indicates a tilt direction. The focus, tracking and tangential directions F, T and K cross each other at right angles and respectively represent each coordinate axis of a three-dimensional orthogonal coordinate system. As shown in FIG. 1A, an objective lens 101 is secured to a lens holder 102. Four focus coils 103a, 103b, 103c and 103d are separately fixed to the lens holder 102 so as to be symmetrical to each other with respect to not only a plane that includes the optical axis J of the objective lens 101 and that is parallel to the tracking direction T but also a plane that includes the optical axis J of the objective lens 101 and that is perpendicular to the tracking direction T. Also, as shown in FIG. 1B, four tracking coils 108a, 108b, 108c and 108d are further provided on a plane of the lens holder 102, which is defined by the tracking and focus directions T and F. The lens holder 102 is supported to a base 107 by way of elastic supporting members 106 so as to freely shift not only in the tracking and focus directions T and F but also swing in the tilt direction R as well.

Furthermore, two magnets 105a and 105b are provided on the base 107 and outside of the focus coils 103a through 103d so as to be symmetrical with respect to the plane that includes the optical axis J of the objective lens 101 and that is parallel to the tracking direction T and so as to be spaced apart from the focus coils 103a through 103d. Yokes 104a, 104b, 104c and 104d, which form integral parts of the base 107, are provided inside of the focus coils 103a, 103b, 103c and 103d, respectively. The yokes 104a through 104d and magnets 105a and 105b together make up a magnetic circuit.

In an objective lens driver with such a configuration, if current is supplied through the focus coils 103a through 103d such that electromagnetic force with the same intensity and same direction is generated from each of the four focus coils 103a through 103d, the objective lens 101 and lens holder 102 can be shifted in the focus direction F without tilting the optical axis J of the objective lens 101 at all. As a result, a focus operation can be carried out just as intended.

On the other hand, if current is supplied through the tracking coils 108a and 108b such that electromagnetic force with the same intensity and same direction is generated from the tracking coils 108c and 108d, then force is generated in the tracking direction T among these coils. In this manner, the lens holder 102 can be shifted in the tracking direction T.

Furthermore, if the amount of current flowing between the focus coils 103a and 103c is set different from that of current flowing between the focus coils 103b and 103d, then the objective lens 101 can be rotated around an axis that is parallel to the tangential direction K. That is to say, the optical axis J can be tilted with respect to the data storage layer of the optical disc. As a result, a tilt correcting operation can be carried out based on a difference in electromagnetic force generated.

In the conventional objective lens driver, to allow the lens holder 102 to shift in the tracking and tilt directions T and R, a gap G needs to be provided between the yokes 104a through 104d and the focus coils 103a through 103d. Also, to achieve sufficient focus driving force, the length L1 of the focus coils 103a through 103d as measured in the tracking direction T needs to be at least equal to a predetermined value. Furthermore, the thickness L2 of the wound focus coils 103a through 103d also needs to be taken into consideration. In addition, to make the tilt correction, each pair of focus coils 103a and 103b or 103c and 103d needs to be arranged in the tracking direction T. For these reasons, the width L of the objective lens driver as measured in the tracking direction T should be at least equal to a predetermined value. For example, L≧13 mm needs to be satisfied. The width of the optical head as measured in the tracking direction is also at least equal to this value. That is to say, to make the tilt correction, the optical head should have a rather big width.

Recently, optical disc drives are built in various types of mobile electronic appliances. As a result, to make optical discs even more handy and lightweight and to increase the maximum amount of data that can be stored on a single optical disc, an optical disc with an increased storage density and with a smaller diameter is now in high demand. In an optical disc with such a small diameter, however, the innermost track thereof has a rather small radius. For example, in an optical disc that has an even smaller diameter than that of a mini disc (MD) (with a diameter of 64 mm), the innermost track thereof has a radius of 10 mm.

To process such a small optical disc, the optical disc drive needs to have the tilt correcting mechanism and shift the objective lens to any location on the innermost track with the radius of about 10 mm. In the optical disc drive, however, a spindle motor for rotating a given optical disc and a turntable to mount the optical disc thereon are provided around the center of the optical disc loaded. Accordingly, if the optical head has a big width in the tracking direction, then the optical head may contact or interfere with the turntable or spindle motor unintentionally.

More specifically, to shift the objective lens to the location defined by the radius of about 10 mm as described above, the optical head and the objective lens driver need to have a width La of about 10 mm or less as measured in the tracking direction T. Accordingly, if an optical disc drive including the conventional objective lens driver is used to read and/or write data from/on such an optical disc with a small diameter and high storage density, then the optical head or the objective lens driver may interfere with the turntable and other members, thus making it difficult to read or write data from/on the innermost and surrounding tracks of the optical disc.

SUMMARY OF THE INVENTION

In order to overcome the problems described above, preferred embodiments of the present invention provide an optical head and an optical disc drive, which can make the tilt correction and which can process such an optical disc with a small diameter without causing any unintentional contact or interference.

An optical head according to a preferred embodiment of the present invention is preferably driven in a tracking direction with respect to an optical disc being rotated. The optical head preferably includes a light source, an optical block, a condenser shifter, and a rotating mechanism. The light source is preferably used to read and write data from/on the optical disc. The optical block preferably supports the light source thereon. The condenser shifter preferably includes a condenser, a movable body, a base, a focus direction drive mechanism and a tracking direction drive mechanism. The condenser is preferably used to condense light, emitted from the light source, toward the optical disc. The movable body preferably supports the condenser thereon. The base preferably supports the movable body elastically such that the movable body is able to shift in a focus direction and in the tracking direction. The focus direction drive mechanism is preferably provided to shift the movable body in the focus direction and the tracking direction drive mechanism is preferably provided to shift the movable body in the tracking direction. The rotating mechanism is preferably used to rotate the condenser shifter around a predetermined axis with respect to the optical block on at least one of a first plane, which is parallel to the tracking direction and perpendicular to the optical disc, and a second plane, which is perpendicular to the tracking direction.

In one preferred embodiment of the present invention, the rotating mechanism preferably includes: a drive source, which is supported by one of the condenser shifter and the optical block; a drive shaft, which is driven by the drive source along an axis; and a sliding portion, which is supported by the other of the condenser shifter and the optical block and which has a friction grip on the drive shaft. The drive source preferably drives the drive shaft with the absolute value of its acceleration changed according to a direction in which the drive shaft is driven.

An optical head according to another preferred embodiment of the present invention is also preferably driven in a tracking direction with respect to an optical disc being rotated. The optical head preferably includes a light source, a condenser shifter, an optical block, a transporting mechanism, and a rotating mechanism. The light source is preferably used to read and write data from/on the optical disc. The condenser shifter preferably includes a condenser, a movable body, a base, a focus direction drive mechanism and a tracking direction drive mechanism. The condenser is preferably used to condense light, emitted from the light source, toward the optical disc. The movable body preferably supports the condenser thereon. The base preferably supports the movable body elastically such that the movable body is able to shift in a focus direction and in the tracking direction. The focus direction drive mechanism is preferably provided to shift the movable body in the focus direction and the tracking direction drive mechanism is preferably provided to shift the movable body in the tracking direction. The optical block preferably supports the light source and the condenser shifter thereon. The transporting mechanism preferably shifts the optical block in the tracking direction with respect to the optical disc. The rotating mechanism preferably rotates the optical block around a predetermined axis with respect to the transporting mechanism on at least one of a first plane, which is parallel to the tracking direction and perpendicular to the optical disc, and a second plane, which is perpendicular to the tracking direction.

In one preferred embodiment of the present invention, the rotating mechanism preferably includes: a drive source, which is supported by one of the optical block and the transporting mechanism; a drive shaft, which is driven by the drive source along an axis; and a sliding portion, which is supported by the other of the optical block and the transporting mechanism and which has a friction grip on the drive shaft. The drive source preferably drives the drive shaft with the absolute value of its acceleration changed according to a direction in which the drive shaft is driven.

In another preferred embodiment, the drive source preferably includes a piezoelectric element.

In still another preferred embodiment, if the drive source drives the drive shaft at an acceleration of which the absolute value is equal to or smaller than a predetermined value, the sliding portion preferably shifts along with the drive shaft. On the other hand, if the drive source drives the drive shaft at an acceleration of which the absolute value exceeds the predetermined value, the sliding portion preferably relatively slides with respect to the drive shaft.

In this particular preferred embodiment, the drive source preferably drives the drive shaft in a first direction at an acceleration of which the absolute value is equal to or smaller than the predetermined value and in a second direction, opposite to the first direction, at an acceleration of which the absolute value is greater than the predetermined value.

In yet another preferred embodiment, the rotating mechanism preferably includes an ultrasonic motor, an electrostatic motor and a shape memory alloy.

In yet another preferred embodiment, each of the focus direction and tracking direction drive mechanisms preferably includes a magnet fixed on the base and a coil provided for the movable body.

In yet another preferred embodiment, the condenser shifter preferably has a convex lower surface, which is received by the optical block.

An optical disc drive according to a preferred embodiment of the present invention preferably includes a disc motor for driving an optical disc and the optical head according to any of the preferred embodiments of the present invention described above.

Other features, elements, processes, steps, characteristics and advantages of the present invention will become more apparent from the following detailed description of preferred embodiments of the present invention with reference to the attached drawings.

BRIEF DESCRIPTION OF THE DRAWINGS

FIGS. 2A and 2B are respectively a plan view and a side view illustrating an optical head for an optical disc drive according to a first specific preferred embodiment of the present invention.

FIGS. 4A and 4B are respectively a plan view and a cross-sectional view showing the rotating mechanism and its surrounding members of the optical head shown in FIGS. 2A and 2B.

FIGS. 6A, 6B and 6C are respectively a plan view and side views illustrating an optical head for an optical disc drive according to a second specific preferred embodiment of the present invention.

FIGS. 7A and 7B are respectively a plan view and a cross-sectional view showing the rotating mechanism and its surrounding members of the optical head shown in FIGS. 6A, 6B and 6C.

FIGS. 8A, 8B and 8C are respectively a plan view and a side view showing a modified example of the optical head shown in FIGS. 6A, 6B and 6C.

FIGS. 9A and 9B are respectively a plan view and a side view showing the rotating mechanism and its surrounding members of an optical disc drive according to a third specific preferred embodiment of the present invention.

DETAILED DESCRIPTION OF PREFERRED EMBODIMENTS

Embodiment 1

Figure 1A:
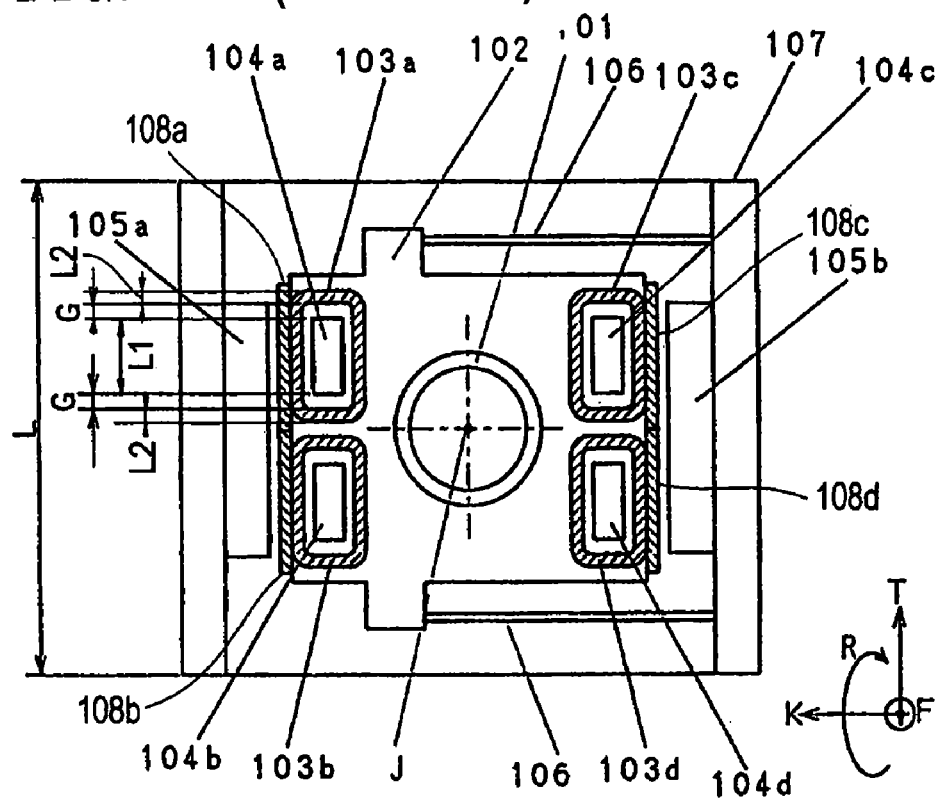
FIG. 1A is a plan view illustrating a conventional objective lens driver.

Hereinafter, an optical head and an optical disc drive according to a first specific preferred embodiment of the present invention will be described. FIG. 2A is a plan view illustrating the optical head 51 of an optical disc drive according to the first preferred embodiment. FIG. 2B is a side view of the optical head 51 shown in FIG. 2A as viewed in the direction P. The optical disc drive of this preferred embodiment preferably includes a disc motor 50 and the optical head 51. The disc motor 50 preferably includes a turntable to mount an optical disc 1 thereon and rotates the optical disc 1 on a center shaft 1*c* at a predetermined rotational velocity.

The optical head 51 preferably includes an optical block 4, a condenser shifter 3 and a rotating mechanism 7 and is preferably supported so as to move in the tracking direction T of the optical disc 1 being rotated and driven by the disc motor 50. For example, the optical disc drive may include a guide pin 6*a* and a feed screw 6*b*. In that case, the optical block 4 preferably includes a supporting portion 4*a* that fits with the guide pin 6*a* and a nut 4*b* (not shown in detail) that engages with the feed screw 6*b*. Accordingly, by getting the feed screw 6*b* rotated by a rotating mechanism such as a motor (not shown), the optical head 51 can be moved in the tracking direction.

Figure 1B:
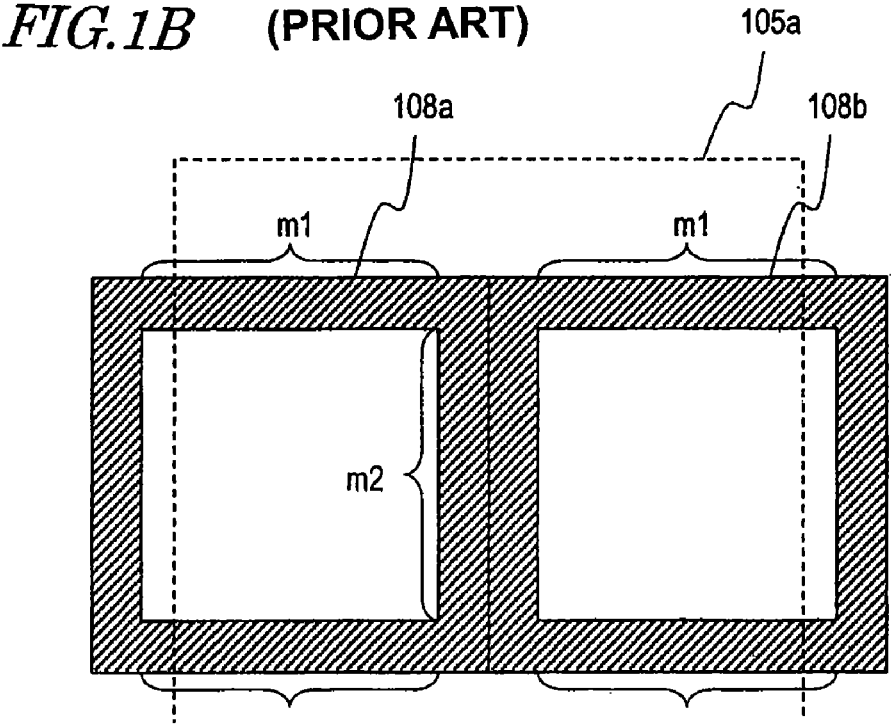
FIG. 1B is a plan view illustrating the tracking coils shown in FIG. 1A.

As in the conventional example shown in FIGS. 1A and 1B, the tracking direction T is also defined in one direction along the radius of the optical disc being rotated and driven, and a focus direction F is also defined perpendicularly to the tracking direction T and a disc tangential direction K. Furthermore, a clockwise or counterclockwise rotational direction around an axis parallel to the tangential direction K will be referred to herein as a "tilt direction $R_K$".

As shown in FIG. 2B, the optical block 4 preferably includes a light source 61 for reading and/or writing data from/on the optical disc 1. The light that has been emitted from the light source 61 is collimated by a collimator lens 62 and then passed through a beam splitter 63 so as to outgo from the optical block 4 as a light beam 64. Also, the light beam 64 that has been reflected back from the optical disc 1 is further reflected by the beam splitter 62 so as to be detected at a photodetector 65.

Figure 3:
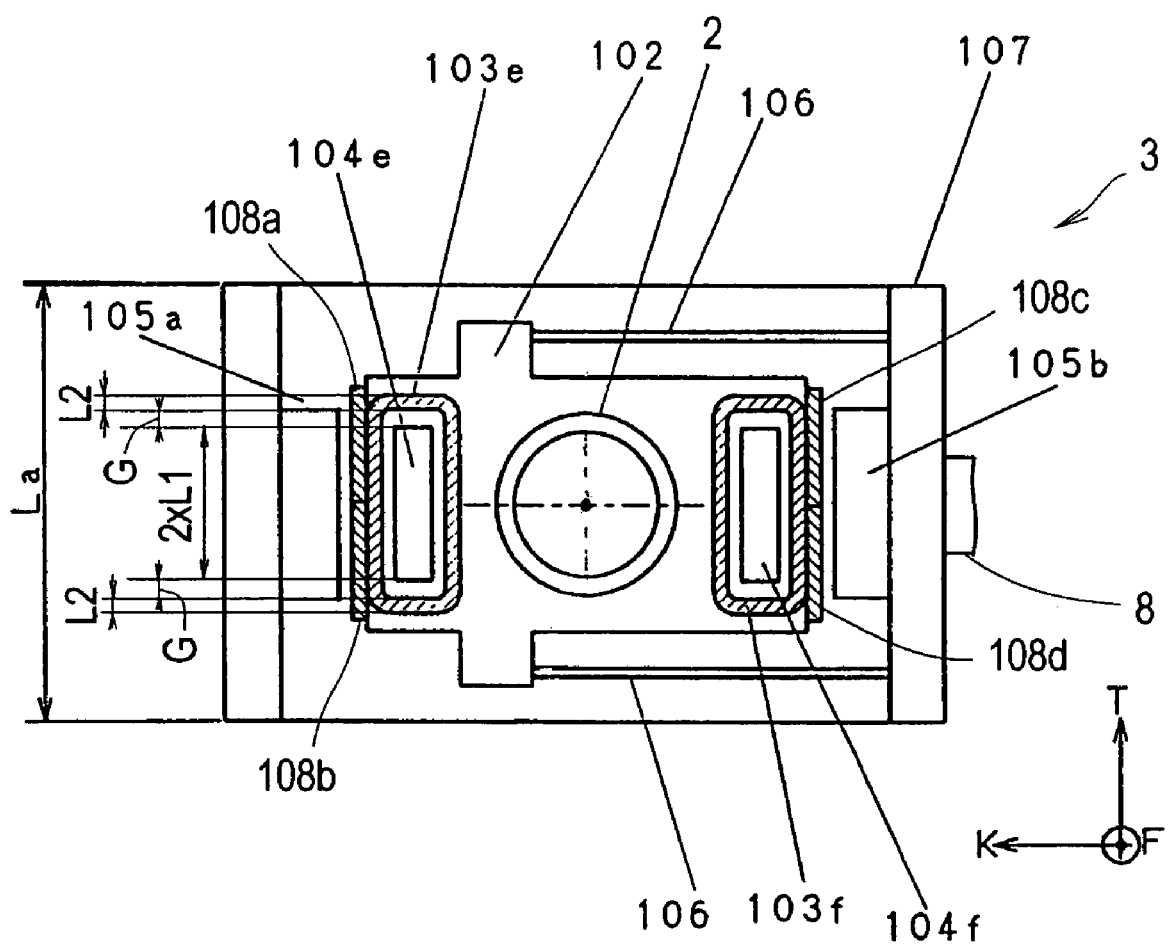
FIG. 3 is a plan view illustrating the condenser shifter of the optical head shown in FIGS. 2A and 2B.

The condenser shifter 3 preferably includes an objective lens 2 as an exemplary optical condenser or as a light converging element for focusing the light beam 64 toward the optical disc 1. FIG. 3 is a plan view showing the condenser shifter 3. As shown in FIG. 3, the condenser shifter 3 preferably includes not only the objective lens 2 but also a lens holder 102 as a movable body for supporting the objective lens 2 thereon, a focus direction drive mechanism, a tracking direction drive mechanism, and a base 107.

The lens holder 102 is elastically supported by supporting members 106 to the base 107 and can be shifted by the focus and tracking direction drive mechanisms in the focus direction F and in the tracking direction T, respectively. As explained in the prior art, each of the focus and tracking direction drive mechanisms also includes coils and magnetic circuits each made up of a magnet and a yoke. More specifically, focus coils 103*e* and 103*f* and tracking coils 108*a*, 108*b*, 108*c* and 108*d* are secured to the lens holder 102. Each of the focus coils 103*e* and 103*f* is preferably wound around an axis that is parallel to the focus direction F and preferably has a flat shape on a plane that is defined by the tracking and tangential directions T and K. As will be described in detail later, there is no need to rotate the lens holder 102 in the tilt direction R, and therefore, just one pair of focus coils needs to be provided in the tracking direction T.

Each of the tracking coils 108*a* through 108*d* is preferably wound around an axis that is parallel to the tangential direction K and preferably has a flat shape on a plane that is defined by the tracking and focus directions T and F. A magnet 105*a* is fixed on the base 107 so as to face the tracking coils 108*a* and 108*b* and another magnet 105*b* is fixed on the base 107 so as to face the tracking coils 108*c* and 108*d*. Also, yokes 104*e* and 104*f* are inserted into the coil holes that are defined by the focus coils 103*e* and 103*f*, respectively.

The magnet 105*a* and the yoke 104*e* together make up a magnetic circuit, while the magnet 105*b* and the yoke 104*f* together make up another magnetic circuit. These magnetic circuits and the focus coils 103*e* and 103*f* make up the focus direction drive mechanism. And these magnetic circuits and the tracking coils 108a through 108d make up the tracking direction drive mechanism.

As shown in FIG. 3, the condenser shifter 3 needs to include just one pair of focus coils in the tracking direction. Thus, the ratio of the sum of the thickness L2 of the coil 103e or 103f and the gap G between the coil 103e or 103f and the yoke 104e or 104f, which does not contribute to shifting the objective lens 2 in the focus direction F, to the overall length in the tracking direction T can be reduced by decreasing the number of focus coils. Accordingly, even if these focus coils have approximately the same effective length as that of the conventional objective lens driver shown in FIG. 1 (i.e., about 2×L1), the length La of the condenser shifter 3 as measured in the tracking direction T can still be shortened. For example, if the coil thickness L2 and the coil-yoke gap G are almost equal to the conventional ones, then the length La of the condenser shifter 3 as measured in the tracking direction T can be reduced to 10 mm. Consequently, the optical head of this preferred embodiment can be shifted inward, i.e., to a location that is closer to the center of the optical disc 1, by about (L−La)/2=1.5 mm than the conventional optical head. Also, if the condenser shifter 3 can have approximately the same length La in the tracking direction T as the conventional objective lens driver, then the condenser shifter 3 can have an increased design margin. It is also possible to improve the performance (e.g., increase the drive sensitivity or the frequency characteristic) of the condenser shifter 3 by extending the effective length L1 of the focus coils or the length of the yokes in the tracking direction T.

In the condenser shifter 3 of this preferred embodiment, two pairs of tracking coils 108a, 108b and 108c, 108d are preferably arranged in the tracking direction T as in the conventional objective lens driver. If the length La of the condenser shifter 3 in the tracking direction T is shortened as described above, then the portions m1 of each of the tracking coils 108a through 108d can have a shorter length as measured in the tracking direction T. The shortened length of the portions m1 would not decrease the overall drivability because the drive force generated in the portions m1 of one tracking coil 108a or 108c and that generated in the portions m1 of the other tracking coil 108b or 108d cancel each other.

On the other hand, the portions m2 of each of the tracking coils 108a through 108d are located inside of the magnetic circuit defined by the magnet 105a or 105b and do contribute to driving. Accordingly, even if the length La of the condenser shifter 3 in the tracking direction T is shortened, approximately the same degree of drivability as the conventional objective lens driver is also achieved by setting the length of the portions m2 approximately equal to the conventional one. That is to say, even if the two pairs of tracking coils are provided in the tracking direction, the length La of the condenser shifter 3 in the tracking direction T can still be shortened without decreasing the drivability.

The rotating mechanism 7 rotates the condenser shifter 3 on a rotation shaft 8 (i.e., in the tilt direction $R_K$ which will also be referred to herein as a "radial tilt direction") with respect to the optical block 4 on a plane that is defined perpendicularly to the tangential direction K (i.e., on a plane that is parallel to the tracking direction T perpendicularly to the optical disc 1). The rotating mechanism 7 may have any dimensions as long as the rotating mechanism 7 can be mounted on the optical block 4 and has drive force to rotate and drive the condenser shifter 3. More specifically, the condenser shifter 3 preferably has a mass of several grams or less, and therefore, the rotating mechanism 7 has only to rotate and drive a mass of at most about 5 g. The rotating mechanism 7 may have a cubic shape with a length of about 5 mm or less each side. Also, the condenser shifter 3 needs to be rotated just few degrees in the tilt direction $R_K$. More specifically, the condenser shifter 3 should be rotated within the range of ±1 degree. Also, the rotating mechanism 7 may either drive the rotation shaft 8 directly or rotate the condenser shifter 3 on the rotation shaft 8 by shifting the condenser shifter 3 with respect to the optical block 4 (i.e., with the condenser shifter 3 just supported on the rotation shaft 8 in a freely rotatable state).

Such a rotating mechanism 7 may be any of various drive mechanisms such as a piezoelectric actuator, an ultrasonic motor, an electrostatic motor, and a shape memory alloy wire.

FIGS. 4A and 4B are respectively a plan view and a side view illustrating an exemplary rotating mechanism 7. As shown in FIGS. 4A and 4B, the rotating mechanism 7 preferably includes a body 20, a drive source 9, a drive shaft 10 and a sliding portion 15.

The body 20 preferably has a hole 21 that receives the rotation shaft 8 of the condenser shifter 3 in a rotatable state. As shown in FIG. 4B, the condenser shifter 3 of this preferred embodiment preferably has a curved lower surface 3b, which is defined by generators that are parallel to each other in the tangential direction K and which makes a line contact with the upper surface 4a of the optical block 4. The radius of curvature of the lower surface 3b and the position of the rotation shaft 8 are adjusted such that when the condenser shifter 3 rotates within an angular range that is defined around the rotation shaft 8, the lower surface 3b always makes a line contact with the upper surface 4a while changing the position of contact. In this case, these surfaces 3b and 4a are preferably finished with high precision so as to produce small friction of contact between them. By supporting the condenser shifter 3 on the upper surface 4a of the optical block 4 in this manner, the friction to be produced between the rotation shaft 8 and the hole 21 can be reduced. However, the condenser shifter 3 has only to be able to rotate on the rotation shaft 8. For example, some gap may be provided between the lower surface 3b of the condenser shifter 3 and the upper surface 4a of the optical block 4 such that the condenser shifter 3 is supported by the rotation shaft 8 only. In that case, the lower and upper surfaces 3b and 4a do not have to be finished with high precision.

The drive source 9 is preferably secured to the body 20 with one end thereof fixed onto the body 20. The drive shaft 10 is attached to the other end of the drive source 9. In this preferred embodiment, the drive shaft 10 preferably extends in the focus direction F and the drive source 9 preferably drives the drive shaft 10 in the focus direction F. However, the drive shaft 10 may also be driven in any other direction. More specifically, the drive source 9 can drive the drive shaft 10 with the absolute value of its acceleration changed according to the direction in which the drive shaft 10 is driven. In this preferred embodiment, a piezoelectric element is preferably used as the drive source 9. Specifically, by shifting the piezoelectric element in the focus direction with a voltage applied thereto, the drive shaft 10 is driven. In this case, by appropriately controlling the profile of the voltage being applied, the absolute value of the acceleration can be changed according to the shifting direction of the piezoelectric element. As a result, the drive shaft 10 can also be driven such that the absolute value of its acceleration changes according to its driving direction. Examples of other drive sources having such features include an electromagnetic plunger, a micromachine, etc. other than the piezoelectric element. For example, the drive shaft 10 may have a cylindrical shape with a diameter of about 0.8 mm to about 1.5 mm and a length of about 3 mm. On the other hand, the piezoelectric element may also have a cylindrical shape with a diameter of about 1 mm to about 1.5 mm and a length of about 1.5 mm to about 2 mm. The cross-sectional shapes of the drive shaft 10 and piezoelectric element do not have to be circular but may also be rectangular or any other shape.

The sliding portion 15 preferably includes a contact portion 16 and a spring portion 17, which are both secured to the condenser shifter 3. The contact portion 16 preferably has a contact surface 16a that contacts with the side surface of the drive shaft 10. The spring portion 17 applies elastic force from its surface 17a to the drive shaft 10 toward the surface 16a of the contact portion 16 such that the surface 16a of the contact portion 16 makes close contact with the side surface of the drive shaft 10. That is to say, the drive shaft 10 is preferably sandwiched between the surface 16a of the contact portion 16 and the surface 17a of the spring portion 17.

The static frictional force produced between the surface 16a of the contact portion 16 and the side surface of the drive shaft 10 is greater than the static frictional force produced around the rotation shaft 8. The static frictional force between the surface 17a of the spring portion 17 and the side surface of the drive shaft 10 may also be relatively great. In any case, the overall sliding portion 15 only needs to have a frictional grip on the drive shaft 10 at great static frictional force. As will be described in detail later, if the drive shaft 10 is driven at an acceleration of which the absolute value is equal to or smaller than a predetermined value, as the drive shaft 10 is driven, the contact portion 16, having a friction grip on the drive shaft 10, also shifts. On the other hand, if the drive shaft 10 is driven at an acceleration of which the absolute value exceeds the predetermined value, then only the drive shaft 10 is driven and the sliding portion 15 relatively slides with respect to the drive shaft 10. In this manner, the sliding portion 15 can be directly moved by the drive shaft 10, and therefore, the rotating mechanism 7 can have a reduced size.

Hereinafter, it will be described how an optical disc drive including such an optical head operates. In reading or writing data from/on the optical disc 1, a light beam 64 is emitted from the light source 61 and then focused by the objective lens 2 toward the optical disc 1. If the rotating optical disc 1 flutters or produces eccentricity, then the objective lens 2 is driven in the focus direction F and tracking direction T by the focus direction drive mechanism and the tracking direction drive mechanism of the condenser shifter 3, thereby coping with the flutter or eccentricity. These control operations are achieved by shifting the objective lens 2 within the condenser shifter 3. Accordingly, the condenser shifter 3 never changes its own position.

If the optical axis of the light beam 64 has tilted with respect to a normal to the surface of the optical disc 1 due to the deformation of the optical disc 1, for example, then the condenser shifter 3 is preferably rotated in its entirety in the tilt direction $R_K$ by the rotating mechanism 7. Specifically, first, as shown in FIG. 4B, a voltage is applied to the piezoelectric element such that the drive source 9 drives the drive shaft 10 in the positive focus direction F (which will be referred to herein as the "direction A"). In this case, the absolute value of the applied voltage is gradually increased such that the applied voltage slowly changes with time. As a result, the piezoelectric element extends gradually and the drive shaft 10 also shifts slowly in the direction A. The static frictional force produced between the sliding portion 15 and the side surface of the drive shaft 10 is greater than that produced around the rotation shaft 8 as described above. Accordingly, the sliding portion 15 also shifts in the direction A along with the drive shaft 10 due to the friction grip between the sliding portion 15 and the drive shaft 10.

If the absolute value of the voltage being applied to the piezoelectric element is decreased steeply in such a state, then the piezoelectric element rapidly shrinks to its original length. As a result, the drive shaft 10 is also shifted in the negative focus direction F (which will be referred to herein as the "direction B") with great acceleration. As the drive shaft 10 is shifted in the direction B, the sliding portion 15, having a friction grip on the drive shaft 10, is also accelerated so as to try to move in the direction B. However, inertial force is created in accordance with the total mass of the sliding portion 15 and the condenser shifter 3 to which the sliding portion 15 is secured. If the inertial force exceeds the static frictional force produced between the sliding portion 15 and the drive shaft 10, then the sliding portion 15 never moves but the drive shaft 10 does move. Consequently, the sliding portion 15 relatively slides on the side surface of the drive shaft 10 to produce relatively small kinetic frictional force between the sliding portion 15 and the drive shaft 10. As a result, only the drive shaft 10 moves in the direction B to return to its original position while the sliding portion 15 does not move in the direction B but remains at its current position.

In this manner, by driving the drive shaft 10 in the direction A with small acceleration and then in the direction B with huge acceleration, the sliding portion 15 can be shifted in the direction A by the extension length of the piezoelectric element as the drive source 9. The extension length of the piezoelectric element is very small, and therefore, the sliding portion 15 cannot be shifted so much in just one cycle of such a drive operation. However, by repeatedly performing the same drive operation in multiple cycles, the sliding portion 15 can be shifted in the direction A by any desired distance. In that case, the piezoelectric element oscillates. By shifting the sliding portion 15 in the direction A, the condenser shifter 3 rotates clockwise on the rotation shaft 8 as viewed from the rotating mechanism 7. The shift amount and the shift velocity of the sliding portion 15 can be set at desired values by adjusting a level of the voltage applied to the piezoelectric element and a profile of the change in the voltage.

To rotate the condenser shifter 3 counterclockwise on the rotation shaft 8 as viewed from the rotating mechanism 7, the sliding portion 15 needs to be shifted in the direction B. More specifically, a steeply rising or falling voltage is applied to the piezoelectric element such that the piezoelectric element rapidly extends in the direction A. Then, the drive shaft 10 quickly shifts in the direction A while the sliding portion 15 never moves but remains at its current position. Thereafter, as the absolute value of the voltage being applied to the piezoelectric element is gradually decreased such that the drive shaft 10 slowly shifts in the direction B, then the sliding portion 15 shifts along with the drive shaft 10 in the direction B due to the friction grip described above. As a result, the sliding portion 15 can be shifted in the direction B.

In the driving method described above, the drive shaft 10 is initially driven in the direction A and then in the direction B. However, the directions in which the drive shaft 10 is driven may be reversed. More specifically, to shift the sliding portion 15 in the direction A, the drive shaft 10 may be initially driven in the direction B with huge acceleration and then in the direction A with small acceleration. On the other hand, to shift the sliding portion 15 in the direction B, the drive shaft 10 may be initially driven in the direction B with small acceleration and then in the direction A with huge acceleration. In this manner, by driving the drive shaft 10 with small acceleration in the direction in which the sliding portion 15 should be shifted and with huge acceleration in the opposite direction, the condenser shifter 3 can be rotated to any desired direction.

When the condenser shifter 3 rotates in the tilt direction $R_K$ in this manner, the objective lens 2 also rotates or tilts in the same tilt direction $R_K$. Accordingly, if the optical disc 1 is deformed in the tracking direction T, then the objective lens 2 may tilt around the tangential line K (i.e., in the tilt direction $R_K$) so that the outgoing light of the objective lens 2 is perpendicularly incident onto the optical disc 1.

According to the preferred embodiment described above, the tilt of the objective lens 2 can be corrected by rotating the condenser shifter 3, in which the objective lens 2 is driven only in the focus and tracking directions. Thus, there is no need to provide any mechanism of driving the objective lens 2 in the tilt direction for the condenser shifter 3, and the size of the condenser shifter 3 can be reduced in the tracking direction. Consequently, in an optical disc drive according to the preferred embodiment of the present invention described above, the optical head thereof can access a location on the innermost and surrounding tracks of an optical disc with a small diameter. In addition, the optical disc drive of the preferred embodiment described above can also correct the tilt of the objective lens in the tilt direction and can be effectively applicable for use to process a high-density optical disc.

If the size of the condenser shifter 3 in the tracking direction is approximately equal to the conventional one, then the sizes of the focus coils and yokes can be increased in the tracking direction. Thus, an optical head and optical disc drive, which can make the tilt correction and of which the condenser shifter exhibits high drive sensitivity, can be provided.

Furthermore, when a sliding structure including a piezoelectric element is adopted as the rotating mechanism 7, the size of the rotating mechanism 7 can be reduced and relatively large force can be produced. Accordingly, the rotating mechanism 7 may be used in an optical head, which can rotate a condenser shifter having a relatively large mass due to its magnet and which has so small a size as to process an optical disc with a small diameter. Since the sliding portion can remain at the same position due to the friction, the condenser shifter can always define the same angle with respect to the optical block even without supplying current to the rotating mechanism 7 constantly. This feature is particularly effective in cutting down the power dissipation of an optical disc drive. For example, if the optical disc drive of the preferred embodiment described above is built in a mobile electronic appliance, then the appliance can operate for a much longer time or can have a reduced size because the appliance needs a less powerful battery.

Figure 5A:
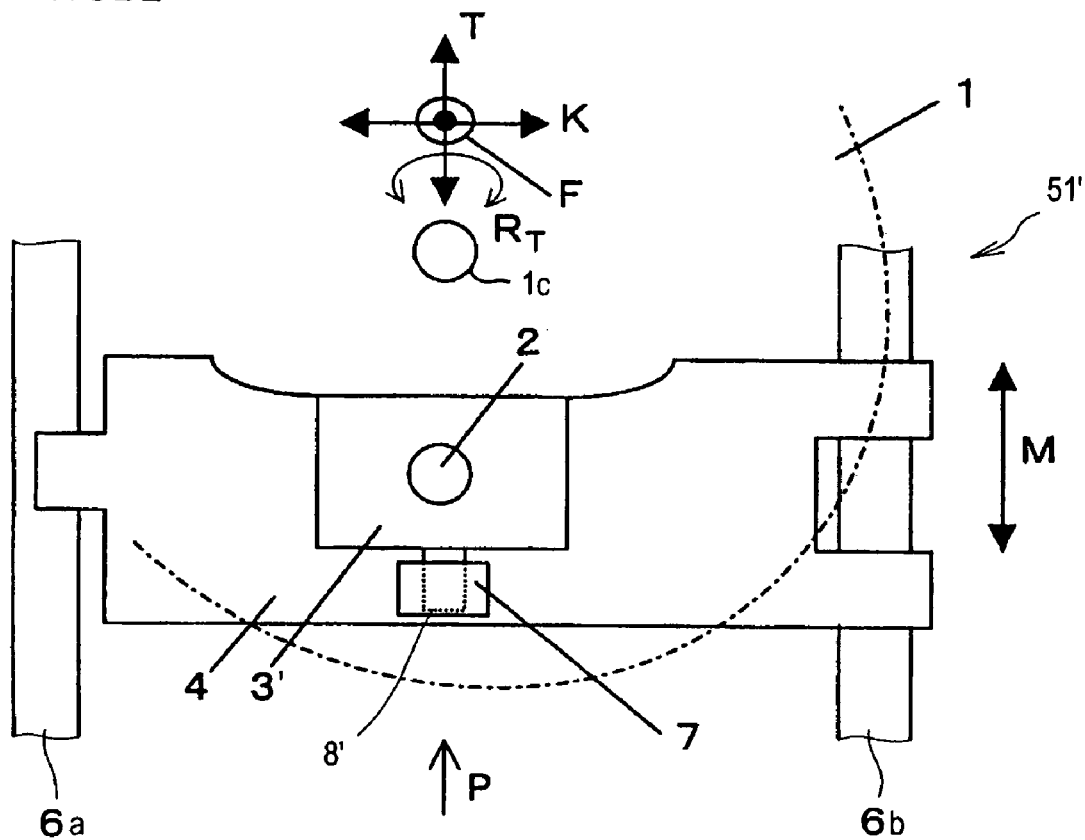
FIGS. 5A and 5B are respectively a plan view and a side view showing a modified example of the optical head shown in FIGS. 2A and 2B.
Figure 5B:
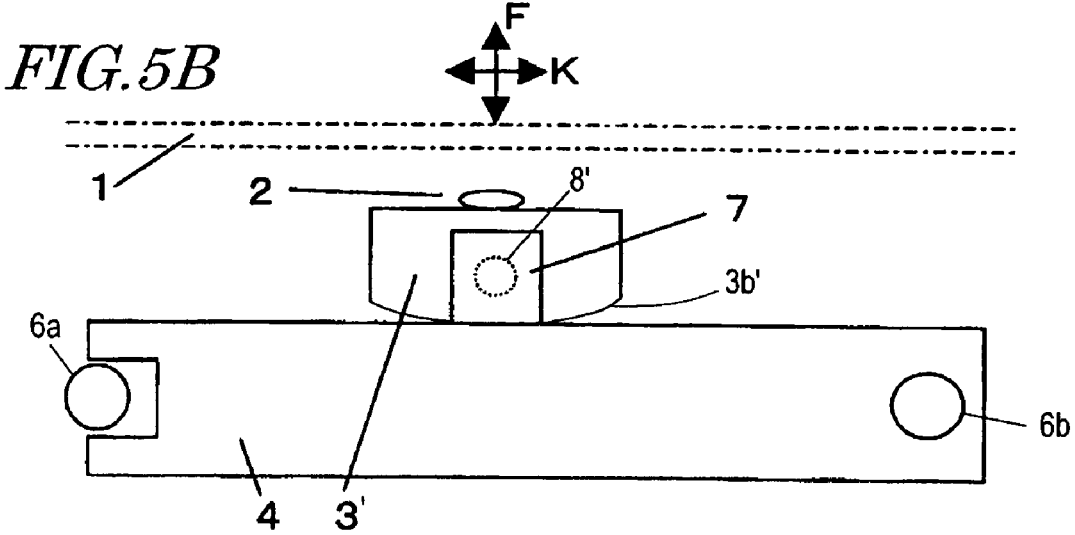

In the optical disc drive of the preferred embodiment described above, the rotating mechanism 7 corrects the radial tilt $R_K$ around the tangential line K. This structure can be used effectively to make a tilt correction on an optical disc 1 that has been deformed so as to have a radius of curvature in the radial direction. However, the optical disc 1 may also be deformed in the tangential direction or circumferential direction thereof as well. In that case, the tangential tilt $R_T$ around an axis parallel to the tracking direction T is preferably corrected. FIGS. 5A and 5B illustrate an optical disc drive including an optical head 51', which can make a tilt correction by rotating the condenser shifter 3 on a plane that is defined perpendicularly to the tracking direction T. As shown in FIGS. 5A and 5B, the optical head 101' preferably includes a condenser shifter 3', the optical block 4 and the rotating mechanism 7.

In the optical head 51', the optical block 4 and rotating mechanism 7 have the same structures as the counterparts of the optical head 51 described above. The condenser shifter 3' includes a rotation shaft 8' extending in the tracking direction and the lower surface 3b' thereof may be a curved surface to be defined by generators that are parallel to each other in the tracking direction T, for example. In the other respects, the condenser shifter 3' has the same structure as the condenser shifter 3 of the optical head 51 described above. The sliding portion 15 (not shown) of the rotating mechanism 7 is provided for the condenser shifter 3'. Although not shown in specifically, the rotating mechanism 7 includes the drive source 9 and drive shaft 10 sliding portion 15 and the body 20 having the hole 21, each of which has the same structure as those of the rotating mechanism 7 explained with reference to FIG. 4.

The rotating mechanism 7 receives the rotation shaft 8' at the hole 21 and corrects the tangential tilt $R_T$ by rotating the condenser shifter 3' around an axis extending in the tracking direction T. The condenser shifter 3' may also be driven by the rotating mechanism 7 by the method described above.

An optical disc drive including such an optical head 51' can make a tilt correction even if the optical disc 1 is deformed either in the tangential direction or in the circumferential direction. Also, as in an optical disc drive including the optical head 51, the optical disc drive including the optical head 51' can effectively process an optical disc with a small diameter and high storage density.

In the optical head 51 and 51' according to the preferred embodiments described above, the drive source 9 and drive shaft 10 are secured to the body 20 fixed on the optical block 4, while the sliding portion 15 is secured to the condenser shifter 3 or 3'. However, similar effects are also achievable even if the sliding portion 5 is secured to the body 20 fixed on the optical block 4 and if the drive source 9 and drive shaft 10 are secured to the condenser shifter 3 or 3'.

Embodiment 2

Hereinafter, an optical head and an optical disc drive according to a second specific preferred embodiment of the present invention will be described. FIG. 6A is a plan view illustrating the optical head 52 of an optical disc drive according to the second preferred embodiment. FIGS. 6B and 6C are side views of the optical head 51 shown in FIG. 6A as viewed in the directions Q and R, respectively. The optical head 52 of this preferred embodiment preferably includes an optical block 41, a condenser shifter 31, a transporting mechanism 42 and a rotating mechanism 7.

As in the optical block 4 of the first preferred embodiment described above, the optical block 41 preferably also includes a light source 61, a collimator lens 62, a beam splitter 63 and a photodetector 65 so as to output a light beam 64. The optical block 41 preferably further includes a rotation shaft 81 and a supporting portion 41a. As shown in FIGS. 6B and 6C, the supporting portion 41a supports a guide pin 6a such that the optical block 41 can rotate on a plane, defined perpendicularly to the tangential direction K, and around an axis 45 passing the center of the guide pin 6a and extending in the tangential direction K. The optical block 41 can also slide along the guide pin 6a in the tracking direction T. In this preferred embodiment, the supporting portion 41a may consist of a pair of supporting bars that sandwiches the guide pin 6a between them. The inside surface of each of these supporting bars, which is opposed to the guide pin 6a, may have an arched cross section 41c, for example. The rotation shaft 81 is preferably provided coaxially with this axis 45.

The condenser shifter 31 preferably includes an objective lens 2 and focuses the light beam 64, emitted from the optical block 41, toward an optical disc 1. As already described with reference to FIG. 3, the condenser shifter 31 preferably includes a focus direction drive mechanism and a tracking direction drive mechanism for driving the objective lens 2 in the focus direction and in the tracking direction, respectively. The condenser shifter 31 of this preferred embodiment is fixed on the optical block 41. Accordingly, although the objective lens 2 can be shifted in the focus direction and in the tracking direction with respect to the condenser shifter 31 and optical block 41, the condenser shifter 31 cannot be shifted with respect to the optical block 41.

The transporting mechanism 42 preferably includes a nut 4b (not shown in detail), which engages with a feed screw 6b extending in the tracking direction. By getting the feed screw 6b driven by a rotating mechanism such as a motor (not shown), the transporting mechanism 42 can be shifted in the tracking direction. The transporting mechanism 42 preferably has a hole 21 to receive the rotation shaft 81 of the optical block 41, thereby supporting the optical block 41 such that the optical block 41 can rotate on the rotation shaft 81 with respect to the transporting mechanism 42. The optical block 41 supported on the guide pin 6a can be shifted by the transporting mechanism 42 in the tracking direction. Also, since the centers of rotation of the rotation shaft 81 and supporting portion 41 are aligned with the axis 45, the optical block 45 can also rotate around the axis 45.

The rotating mechanism 7 rotates the optical block 41 on the rotation shaft 81 (i.e., in the tilt direction $R_K$) with respect to the transporting mechanism 42 on a plane that is defined perpendicularly to the tangential direction K (i.e., a plane that is parallel to the tracking direction T perpendicularly to the optical disc 1). The rotating mechanism 7 has such a shape as to be mounted on either the transporting mechanism 42 or the optical block 41 and may be any of various types of drive mechanisms as already described for the first preferred embodiment. FIG. 7A is a plan view illustrating an exemplary rotating mechanism 7 and FIG. 7B is cross-sectional view thereof as taken along the one-dot chain VIIb—VIIb shown in FIG. 7A.

The rotating mechanism 7 preferably includes a drive source 9, a drive shaft 10 and a sliding portion 15. As can be seen from FIGS. 7A and 7B, the drive source 9, drive shaft 10 and sliding portion 15 are arranged as in the first preferred embodiment described above. One end of the drive source 9 is secured to, and supported by, the transporting mechanism 42, while the other end thereof receives the drive shaft 10. In this preferred embodiment, a piezoelectric element is also used as an exemplary drive source 9. The sliding portion 15 includes a contact portion 16 and a spring portion 17, which are secured to the optical block 41. As in the first preferred embodiment described above, if the drive shaft 10 is driven at a predetermined acceleration or less, then the contact portion 16 also shifts along with the drive shaft 10 due to the friction grip between them. On the other hand, if the drive shaft 10 is driven at an acceleration exceeding the predetermined value, then the sliding portion 15 relatively slides with respect to the drive shaft 10.

When the optical disc drive of this preferred embodiment reads or writes data from/on the optical disc 1, the condensing state of the light beam is also controlled by driving the objective lens 2 in the focus direction F and in the tracking direction T as in the first preferred embodiment described above.

The radial tilt $R_K$ is corrected by using the rotating mechanism 7. As described in detail for the first preferred embodiment, the drive shaft 10 is driven with its acceleration changed according to the shifting direction, thereby shifting the sliding portion 15 and rotating the optical block 41 on the rotation shaft 81. As a result, the objective lens 2 rotates in the tilt direction $R_K$.

According to the preferred embodiment described above, the tilt of the objective lens 2 can be corrected by rotating the optical block 41, while the objective lens 2 is driven only in the focus and tracking directions in the condenser shifter 31. Thus, there is no need to provide any mechanism of driving the objective lens 2 in the tilt direction for the condenser shifter 31. As a result, the size of the condenser shifter 31 can be reduced in the tracking direction. Consequently, in an optical disc drive according to the preferred embodiment of the present invention described above, the optical head thereof can access a location on the innermost and surrounding tracks of an optical disc with a small diameter. In addition, the optical disc drive of the preferred embodiment described above can also correct the tilt of the objective lens in the tilt direction and can be effectively applicable for use to process a high-density optical disc.

In this second preferred embodiment, in particular, the tilt of the objective lens 2 with respect to the optical disc 1 is corrected by rotating the overall optical block 41 in the tilt direction. Accordingly, the objective lens 2 and the light beam 64 can always be rotated together without creating any misalignment between the optical axis of the objective lens 2 and that of the light beam 64. That is to say, the outgoing light of the objective lens 2 has no optical aberration. Consequently, even if the objective lens 2 has tilted with respect to the optical disc 1, the light beam impinging on the optical disc 1 can be maintained in its intended state, thus making it possible to perform read and write operation with more stability.

In the optical disc drive that has been described with reference to FIGS. 6A through 7B, the rotating mechanism 7 corrects the radial tilt $R_K$ around the tangential line K. However, as already described for the first preferred embodiment, the present invention is also applicable for use in an optical disc drive that can correct the tangential tilt $R_T$ with respect to the tracking direction T.

FIGS. 8A, 8B and 8C illustrate an optical disc drive including an optical head 52', which can make a tilt correction by rotating the optical block 41 on a plane that is defined perpendicularly to the tracking direction T. As shown in FIGS. 8A, 8B and 8C, the optical head 52' preferably includes the condenser shifter 31, an optical block 41', a transporting mechanism 43 and the rotating mechanism 7.

In the optical head 52', the condenser shifter 31 has the same structure as the counterpart of the optical head 52 described above. The optical block 41' includes a rotation shaft 82, which extends in the tracking direction unlike the rotation shaft 81 of the optical block 41 described above. The optical block 41' includes no supporting portion to support the guide 6a but the rotation shaft 82 thereof is supported by the transporting mechanism 43.

The transporting mechanism 43 receives the rotation shaft 82 at a hole 21 and supports the optical block 41' such that the optical block 41' can rotate around an axis extending in the tracking direction T. The transporting mechanism 43 includes a supporting portion 43a and a nut 4b (not shown in detail). The supporting portion 43a fits with the guide 6a such that the transporting mechanism 43 can shift in the tracking direction. The transporting mechanism 43 does not rotate in the tangential direction. Accordingly, the inside surface 43c of each supporting portion 43a, opposed to the guide 6a, is flat. The nut 4b engages with the feed screw 6b. By driving the feed screw 6b, the transporting mechanism 43 and the overall optical head 52' can be shifted in the tracking direction.

Although not shown in FIG. 8, Although not shown in specifically, the rotating mechanism 7 includes the drive source 9 and drive shaft 10 sliding portion 15 and the body 20 having the hole 21, each of which has the same structure as those of the rotating mechanism 7 explained with reference to FIG. 7. In the optical head 52', however, the optical block 41' is rotated around an axis extending in the tracking direction T (i.e., rotated in the tilt direction $R_T$), thereby correcting the tilt of the objective lens 2 with respect to the optical disc 1. The optical block 41' may also be driven by the rotating mechanism 7 by the method described for the first preferred embodiment.

An optical disc drive including such an optical head 52' can make a tilt correction even if the optical disc 1 is deformed either in the tangential direction or in the circumferential direction. Also, as in an optical disc drive including the optical head 52, the optical disc drive including the optical head 52' can effectively process an optical disc with a small diameter and high storage density.

Embodiment 3

Hereinafter, an optical head and an optical disc drive according to a third specific preferred embodiment of the present invention will be described. The optical head and optical disc drive of this third preferred embodiment includes a rotating mechanism 71 instead of the rotating mechanism 7 of the second preferred embodiment. However, each of the other members thereof has the same structure as the counterpart of the second preferred embodiment described above. Thus, the following description of the third preferred embodiment will be focused on the rotating mechanism 71.

FIG. 9A is a plan view illustrating a transporting mechanism 42, including the rotating mechanism 71, and an optical block 41. FIG. 9B is a cross-sectional view thereof as taken along the one-dot chain IXb—IXb shown in FIG. 9A.

The rotating mechanism 71 includes a drive source 9, a drive shaft 10 and a sliding portion 15. Each of the drive source 9 and drive shaft 10 may have the same structure as the counterpart of the first preferred embodiment described above. The sliding portion 15 includes a contact portion 13, a link portion 11 and a pin 14. The contact portion 13 has a through hole 13a to receive the drive shaft 10 and is connected to the link portion 11 with a through hole 12 to receive the pin 14 that is fixed to the optical block 41. The link portion 11, as well as the contact portion 13, shifts vertically either in the direction A or in the direction B, while the pin 14 rotates on the rotation shaft 81. Accordingly, to allow the optical block 41 to shift in the tracking direction T with the rotation of the pin 14, the through hole 12 of the link portion 11 is preferably greater than the diameter of the pin 14. However, if the through hole 12 is too big, then the wall of the through hole 12 may apply no elastic force to the pin 14 even after the link portion 11 has been moved. If the sliding portion 15 had such a "dead zone", then the optical block 41 could not be rotated smoothly. In that case, such a "dead zone" can be eliminated by further providing a spring member, for example, inside of the through hole 12 such that the pin 14 can always keep contact with the through hole 12 or the spring member due to the elastic force applied thereto in the focus direction F.

In this case, the static frictional force produced between the side surface of the drive shaft 10 and the contact portion 13 is greater than the sum of the static frictional force produced around the rotation shaft 81 and the frictional force produced between the through hole 12 and the pin 14. Accordingly, if the drive shaft 10 is driven either in the direction A or in the direction B at a predetermined acceleration or less, then the contact portion 13 also shifts in the same direction with the drive shaft 10 due to the friction grip. As a result, the link portion 11 connected to the contact portion 13 applies elastic force to the pin 14 toward either the direction A or the direction B, and the optical block 41, receiving the drive force from the pin 14, rotates on the rotation shaft 81. That is to say, the sliding portion 15, having a friction grip on the drive shaft 10, shifts along with the drive shaft 10, thereby rotating the optical block 41.

On the other hand, if the drive shaft 10 is driven with an acceleration exceeding the predetermined value, then the inertial force of the contact portion 13 exceeds the static frictional force produced between the drive shaft 10 and the contact portion 13. Thus, kinetic friction is produced between the drive shaft 10 and the contact portion 13 and only the drive shaft 10 moves. That is to say, only the drive shaft 10 moves such that the sliding portion 15 relatively shifts along the side surface of the drive shaft 10. As a result, the optical block 41 can maintain a predetermined angle with respect to the transporting mechanism 42.

As already described in detail for the first preferred embodiment, by driving the drive shaft 10 with its acceleration changed according to the shifting direction thereof, these two types of operations can be performed repeatedly such that the sliding portion 15 can be shifted a long distance. As a result, the effects of the first or second preferred embodiment described above are also achieved by this preferred embodiment.

In the preferred embodiment described above, the pin 14 is fixed to the optical block 41. Alternatively, the pin 14 may also be fixed to the link portion 11 and the optical block 41 may have a hole to receive the pin 14. Also, the drive source 9 and drive shaft 10 may be provided for the optical block 41 and the sliding portion 15 may be provided for the transporting mechanism 42.

According to various preferred embodiments of the present invention described above, the tilt of an objective lens can be corrected by rotating either a condenser shifter or an optical block including the condenser shifter. In the condenser shifter, the objective lens is driven only in focus and tracking directions. Thus, there is no need to provide any mechanism of driving the objective lens in the tilt direction for the condenser shifter. As a result, the size of the condenser shifter can be reduced in the tracking direction. Consequently, in an optical disc drive according to any preferred embodiment of the present invention described above, the optical head thereof can access a location on the innermost and surrounding tracks of an optical disc with a small diameter. In addition, the optical disc drive of the preferred embodiment described above can also correct the tilt of the objective lens in the tilt direction and can be effectively applicable for use to process a high-density optical disc.

The preferred embodiments of the present invention described above relate to an optical head and an optical disc drive that selectively makes a tilt correction either in the radial direction or in the tangential direction. However, an optical head and an optical disc drive for making tilt corrections in both of these two directions may also be provided. For example, if the optical head 51 shown in FIG. 2 is combined with the optical head 52' shown in FIG. 8 such that the condenser shifter 3 and rotating mechanism 7 shown in FIG. 2 are provided on the optical block of the optical head 52', then the resultant optical head and optical disc drive can make tilt corrections both in the radial and tangential directions. Alternatively, the optical head 51 shown in FIG. 2 may be combined with the optical head 51' shown in FIG. 5. In that case, the condenser shifter 3 and rotating mechanism 7 shown in FIG. 2 may be provided on a sub-block and the condenser shifter 3 may be rotated with respect to the sub-block. Also, the sub-block and another rotating mechanism may be provided on the optical block and the sub-block may be rotated with respect to the optical block by the rotating mechanism. As another alternative, the optical head 52 shown in FIG. 6 may also be combined with the optical head 52' shown in FIG. 8.

The present invention is applicable for use in any of various types of optical heads and optical disc drives for reading and/or writing data from an optical disc. Among other things, the present invention is particularly effectively applicable for use in an optical disc drive that is specially designed to process a high-density optical disc with a small diameter.

This application is based on Japanese Patent Applications No. 2003-013053 filed on Jan. 22, 2003 and No. 2004-006317 filed on Jan. 14, 2004, the entire contents of which are hereby incorporated by reference.

While the present invention has been described with respect to preferred embodiments thereof, it will be apparent to those skilled in the art that the disclosed invention may be modified in numerous ways and may assume many embodiments other than those specifically described above. Accordingly, it is intended by the appended claims to cover all modifications of the invention that fall within the true spirit and scope of the invention.

What is claimed is:

1. An optical head to be driven in a tracking direction with respect to an optical disc being rotated, the optical head comprising:
   a light source for reading and writing data from/on the optical disc;
   an optical block for supporting the light source thereon;
   a condenser shifter including a condenser, a movable body, a base, a focus direction drive mechanism and a tracking direction drive mechanism, wherein the condenser is used to condense light, emitted from the light source, toward the optical disc, the movable body supports the condenser thereon, the base supports the movable body elastically such that the movable body is able to shift in a focus direction and in the tracking direction, the focus direction drive mechanism is provided to shift the movable body in the focus direction and the tracking direction drive mechanism is provided to shift the movable body in the tracking direction; and
   a rotating mechanism for rotating the condenser shifter around a predetermined axis with respect to the optical block on at least one of a first plane, which is parallel to the tracking direction and perpendicular to the optical disc, and a second plane, which is perpendicular to the tracking direction.

2. The optical head of claim 1, wherein the rotating mechanism includes:
   a drive source, which is supported by one of the condenser shifter and the optical block;
   a drive shaft, which is driven by the drive source along an axis; and
   a sliding portion, which is supported by the other of the condenser shifter and the optical block and which has a friction grip on the drive shaft,
   wherein the drive source drives the drive shaft with the absolute value of its acceleration changed according to a direction in which the drive shaft is driven.

3. The optical head of claim 2, wherein the drive source includes a piezoelectric element.

4. The optical head of claim 1, wherein if the drive source drives the drive shaft at an acceleration of which the absolute value is equal to or smaller than a predetermined value, the sliding portion shifts along with the drive shaft, and
   wherein if the drive source drives the drive shaft at an acceleration of which the absolute value exceeds the predetermined value, the sliding portion relatively slides with respect to the drive shaft.

5. The optical head of claim 4, wherein the drive source drives the drive shaft in a first direction at an acceleration of which the absolute value is equal to or smaller than the predetermined value and in a second direction, opposite to the first direction, at an acceleration of which the absolute value is greater than the predetermined value.

6. The optical head of claim 1, wherein the rotating mechanism includes an ultrasonic motor, an electrostatic motor and a shape memory alloy.

7. The optical head of claim 1, wherein each of the focus direction and tracking direction drive mechanisms includes a magnet, which is fixed on the base, and a coil, which is provided for the movable body.

8. The optical head of claim 2, wherein the condenser shifter has a convex lower surface, which is received by the optical block.

9. An optical disc drive comprising:
   a disc motor for driving an optical disc; and the optical head defined by claim 1.

10. An optical head to be driven in a tracking direction with respect to an optical disc being rotated, the optical head comprising:
    a light source for reading and writing data from/on the optical disc;
    a condenser shifter including a condenser, a movable body, a base, a focus direction drive mechanism and a tracking direction drive mechanism, wherein the condenser is used to condense light, emitted from the light source, toward the optical disc, the movable body supports the condenser thereon, the base supports the movable body elastically such that the movable body is able to shift in a focus direction and in the tracking direction, the focus direction drive mechanism is provided to shift the movable body in the focus direction and the tracking direction drive mechanism is provided to shift the movable body in the tracking direction;
    an optical block for supporting the light source and the condenser shifter thereon;
    a transporting mechanism for shifting the optical block in the tracking direction with respect to the optical disc; and
    a rotating mechanism for rotating the optical block around a predetermined axis with respect to the transporting mechanism on at least one of a first plane, which is parallel to the tracking direction and perpendicular to the optical disc, and a second plane, which is perpendicular to the tracking direction.

11. The optical head of claim 10, wherein the rotating mechanism includes:
a drive source, which is supported by one of the optical block and the transporting mechanism;
a drive shaft, which is driven by the drive source along an axis; and
a sliding portion, which is supported by the other of the optical block and the transporting mechanism and which has a friction grip on the drive shaft,
wherein the drive source drives the drive shaft with the absolute value of its acceleration changed according to a direction in which the drive shaft is driven.

* * * * *